(12) United States Patent
Kim

(10) Patent No.: US 6,779,068 B2
(45) Date of Patent: Aug. 17, 2004

(54) PORTABLE COMPUTER AND AUTOMATIC SETTING METHOD OF MASTER/SLAVE DEVICES FOR THE SAME

(75) Inventor: Hyung-Jun Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 450 days.

(21) Appl. No.: 09/910,917

(22) Filed: Jul. 24, 2001

(65) Prior Publication Data

US 2002/0078281 A1 Jun. 20, 2002

(30) Foreign Application Priority Data

Dec. 19, 2000 (KR) .......................................... 2000-78573

(51) Int. Cl.⁷ .............................. G06F 13/00; G06F 9/00
(52) U.S. Cl. ........................ 710/303; 710/301; 709/209
(58) Field of Search ............................ 710/303, 8, 300, 710/2, 110, 106, 301–302; 709/227, 209; 326/68; 439/61; 307/112; 370/464; 713/1

(56) References Cited

U.S. PATENT DOCUMENTS 5,649,233 A * 7/1997 Chen .............................. 710/8
5,761,460 A    6/1998 Santos et al.
5,996,045 A    11/1999 Lee et al.
6,016,518 A * 1/2000 Matsushima et al. .......... 710/8
6,044,423 A * 3/2000 Seo et al. .................... 710/302
6,378,015 B1 * 4/2002 Yen ............................. 711/115
6,654,842 B1 * 11/2003 Park ............................ 710/302

FOREIGN PATENT DOCUMENTS

JP    10-124444    5/1998
JP    11-288357    10/1999

* cited by examiner

Primary Examiner—Gopal C. Ray
(74) Attorney, Agent, or Firm—Robert E. Bushnell, Esq.

(57) ABSTRACT

A portable computer having two peripheral bays conforming to integrated drive electronics standard interface. A peripheral in one bay is always recognized as a master device and not a slave device. A peripheral in the other bay is recognized as a slave only when the first bay is occupied by a peripheral. This way, the situation never arises where there is a slave device without a master peripheral device. The bays may reside in the portable computer main body or in a docking station. A circuit can sense the presence or the absence of peripherals in the bays to thus prevent the situation of a slave peripheral being present when there is no master device.

20 Claims, 4 Drawing Sheets

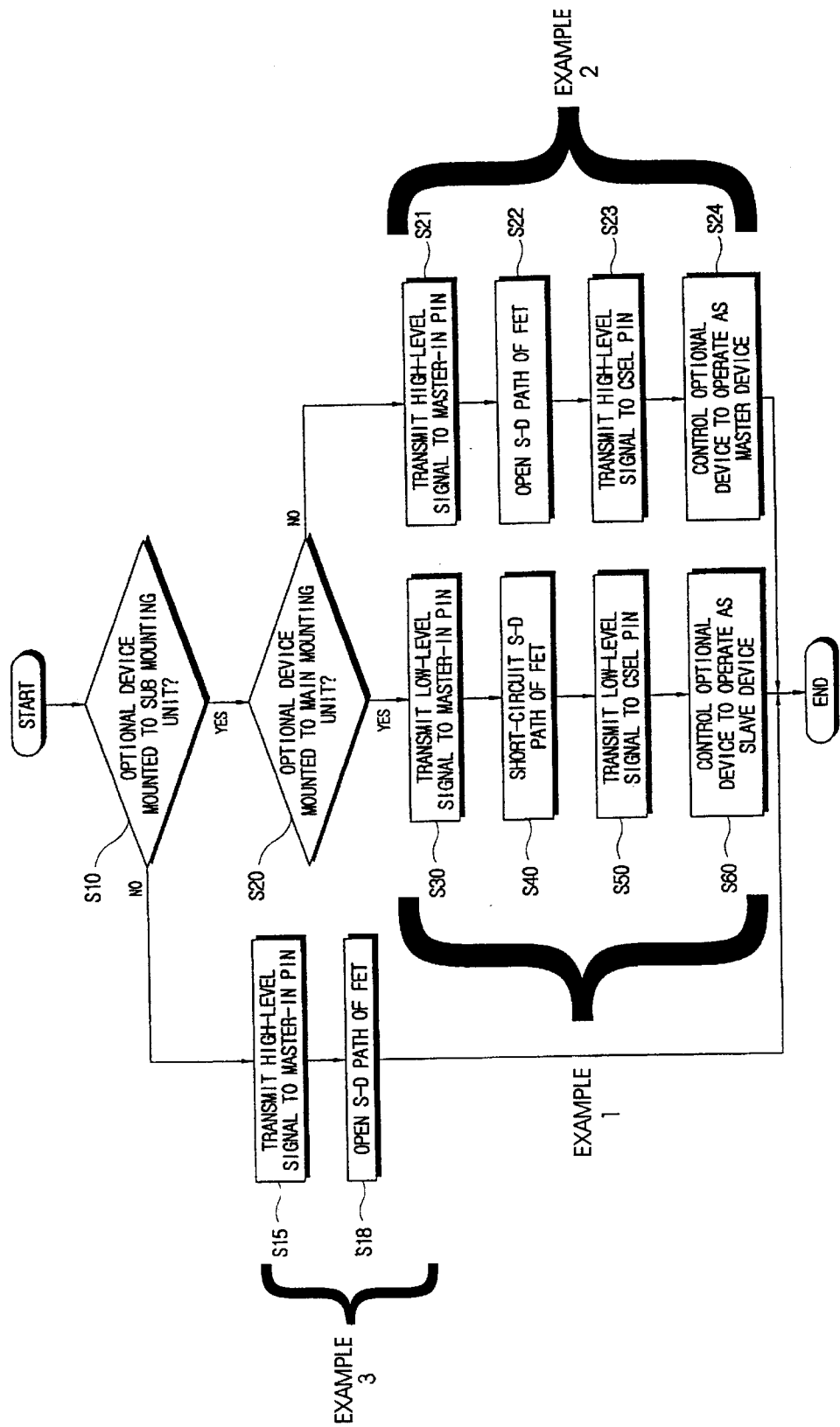

FIG. 4 — FIRST EMBODIMENT

| | 31a | 31b | (OR Gate) output of Gate 32 | output of master-in pin | S-D FET conduction | CSEL state | result of 40b |
|---|---|---|---|---|---|---|---|
| EXAMPLE 1<br>Both Ports occupied | L | L | L | L | Short Circuit | L | SLAVE |
| EXAMPLE 2<br>Main Mounting Unit unoccupied<br>Sub Mounting Unit Occupied | H | L | H | H | Open Circuit | H | MASTER |
| EXAMPLE 3<br>Sub Mounting Unit is Unoccupied | * | H | H | H | Open Circuit | * | * |

FIG. 5 — SECOND EMBODIMENT

| | 31a | 31b | (AND Gate) output of Gate 32 | output of master-in pin | S-D FET conduction | CSEL state | result of 40b |
|---|---|---|---|---|---|---|---|
| Both Mounting Units Occupied | H | H | H | H | Open Circuit | H | SLAVE |
| Only Sub Mounting Unit Occupied | L | H | L | L | Short Circuit | L | MASTER |
| Sub Mounting Unit is Unoccupied | * | L | L | L | Short Circuit | * | * |

PORTABLE COMPUTER AND AUTOMATIC SETTING METHOD OF MASTER/SLAVE DEVICES FOR THE SAME

CLAIM OF PRIORITY

This application makes reference to, incorporates the same herein, and claims all benefits accruing under 35 U.S.C. §119 from my application entitled PORTABLE COMPUTER AND METHOD FOR SETTING UP MASTER DEVICE AND SLAVE DEVICE FOR PORTABLE COMPUTER filed with the Korean Industrial Property Office on Dec. 19, 2000 and there duly assigned Ser. No. 78573/2000.

BACKGROUND OF THE INVENTION

1. Field of the Invention

The present invention relates to a portable computer and an automatic setting method of master/slave devices for the portable computer.

2. Description of the Related Art

Chipsets adapted to be mounted to the main board of a portable computer, for example, chipsets by Intel Corporation, support two integrated drive electronics (IDE) channels, that is, a primary channel and a secondary channel. Generally, the primary channel is allocated for a master hard disk drive internally mounted to a portable computer which is set as a Master. The secondary channel is allocated for optional devices to be externally mounted to the portable computer. To this end, the portable computer is provided with secondary mounting units for mounting optional devices as a master device and a slave device, respectively. Such optional devices may include a CD-ROM, a ZIP drive, a DVD-ROM, a CD-RW, and a second hard disk drive.

The secondary mounting units of the conventional portable computers are not fixed for such optional devices as a master device and a slave device, respectively. Instead, optional devices mounted to the secondary mounting units are set to master and slave devices, respectively, using cable select pins provided in those optional devices.

In this case, however, there is a drawback in that the optional device set to the master device cannot operate as a slave device. In similar, the optional device set to the slave device cannot operate as a master device. Furthermore, where the master device is removed from the conventional portable computer while the slave device remains mounted, the computer cannot recognize the slave device, and therefore, the slave device cannot be used.

What is needed is an automatic mechanism for a portable computer that has two mounting units in which the two mounting units receive external devices. If both mounting units are occupied by external devices, the computer system designates the main mounting unit as the master and the sub mounting unit as the slave. Should the external device be removed from the main mounting unit, while an external device remains in the sub mounting unit, the external device in the sub mounting unit is designated automatically as master so that it can be recognized by the computer. The computer is dockable with a docking station and it is possible to have the sub mounting unit and the main mounting unit to reside in the docking station instead of in the computer.

SUMMARY OF THE INVENTION

Accordingly, it is an object of the present invention is to provide a portable computer capable of using optional devices, mounted thereto, irrespective of a master/slave setting condition initially made.

It is also an object of the present invention is to provide an automatic setting method of master/slave devices as optional devices mounted to a portable computer, which is capable of allowing each of those optional devices to be used, irrespective of a master/slave setting condition initially made.

It is yet another object of the present invention to provide a computer system having a main mounting unit and a sub mounting unit, so that if both are occupied by external devices, the main mounting unit is master and the sub mounting unit is a slave.

It is further an object of the present invention to provide a computer system that automatically recognizes the external device in the sub mounting unit as a master device should the external unit of the main mounting unit be removed.

It is further an embodiment of the present invention to provide the main mounting unit and the sub mounting unit in a docking station instead of in a body of a computer allowing the external device in the sub mounting unit to be recognized as a master device when the external device in the main mounting unit is removed.

In accordance with one aspect of the present invention, these and other objects may be accomplished by the provision of a portable computer having a computer body, a main board mounted to the computer body, main and sub mounting units connected to the main board and adapted to allow external devices according to an IDE standard interface scheme to be mounted thereto, respectively, external devices each adapted to output a signal indicative of whether or not the external device is connected to an associated one of the main and sub mounting units, each of the external devices having a connection means to be coupled to an associated one of the main and sub mounting units; and a control unit for recognizing the external device mounted to the main mounting unit as a master device and the external device mounted to the sub mounting unit as a slave device, respectively, while recognizing the external device mount to the sub mounting unit as a master device under a condition in which there is no external device mounted to the main mounting unit.

Preferably, the portable computer further comprises a docking station separated from the computer body while being connected to the main board for a signal exchange with the main board. The control unit and the main and sub mounting units may be provided in the portable computer. In this case, there is an advantage in that the computer body has a reduced volume. Preferably, the connection means has a ground terminal for outputting the signal indicative of whether or not the external device associated therewith is connected to an associated one of the main and sub mounting units.

In accordance with another aspect of the present invention, these and other objects may also be achieved by the provision of an automatic setting method of master/slave devices for external devices mounted to a portable computer including a computer body, a pair of mounting units adapted to allow the external devices to be mounted thereto, respectively, each of the external devices having a configuration according to IDE standard interface scheme, and a main board connected with the mounting units, having the steps of setting the mounting units as main and sub mounting units, respectively, determining whether or not the external devices are mounted to the main and sub mounting units, respectively, and recognizing the external device mounted to the main mounting unit as a master device and the external device mounted to the sub mounting unit as a slave device, respectively, while recognizing the external device mount to the sub mounting unit as a master device when it is determined that there is no external device mounted to the main mounting unit. Preferably, the determination of whether or not each of the external devices is mounted to an associated one of the main and sub mounting units is carried out, based on a ground signal generated when the external device is mounted to the associated mounting unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 3 is a flow chart illustrating processes for automatically setting up an optional device mounted to a portable computer as a master or slave device, in the portable computer according to the first embodiment of the present invention;

FIG. 4 is a table illustrating the signals of the electronic circuit for the first embodiment of the present invention; and FIG. 5 is a table illustrating the signals of the electronic circuit for the second embodiment of the present invention.

DETAILED DESCRIPTION OF THE INVENTION

Figure 1:
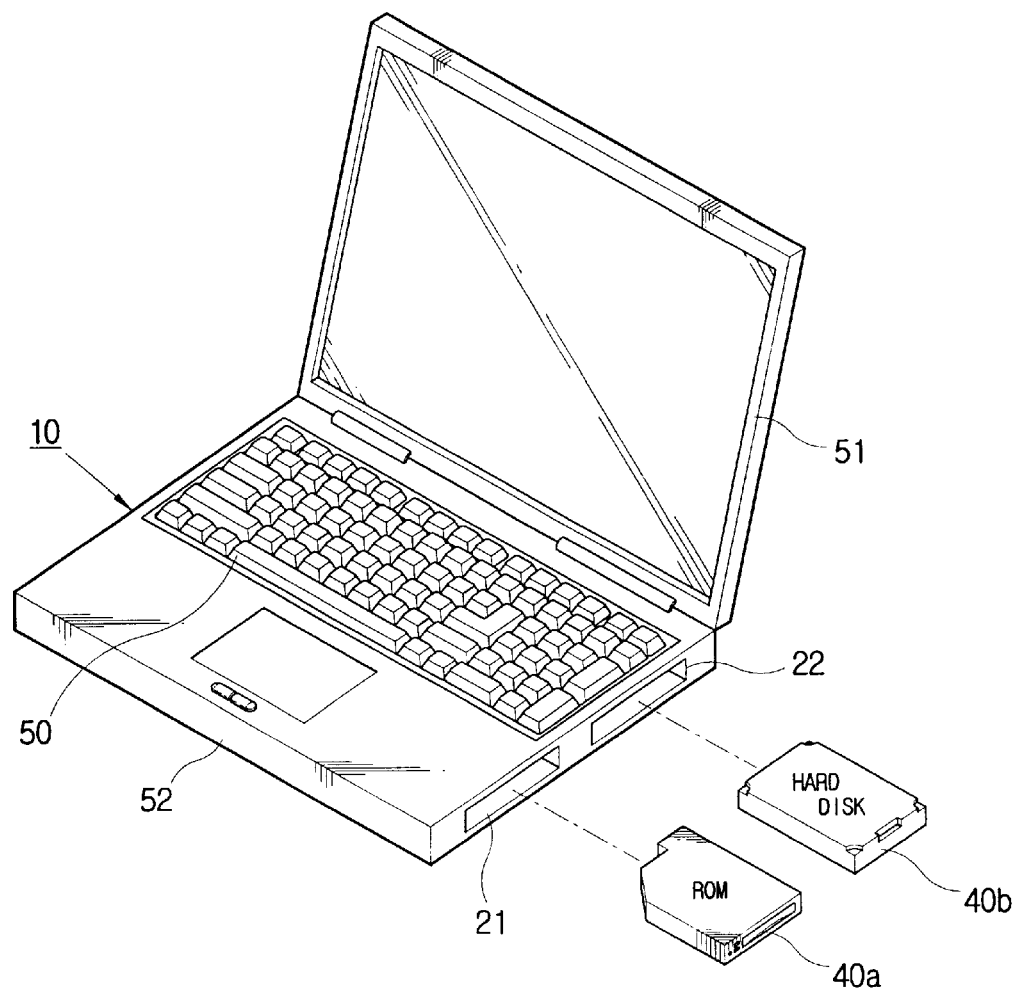
FIG. 1 is a perspective view illustrating a portable computer according to the present invention.
Figure 2:
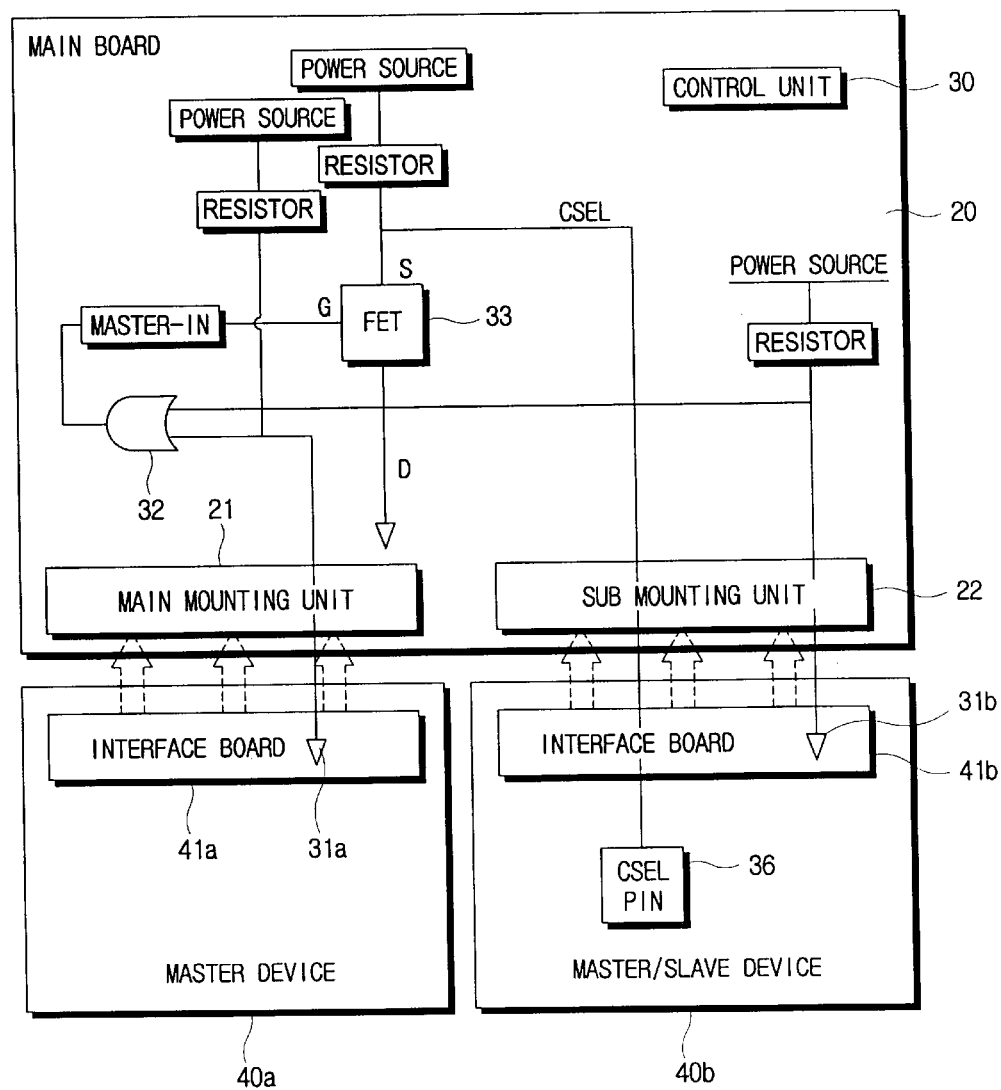
FIG. 2 is a block diagram illustrating a control circuit of the portable computer according to the first embodiment of the present invention.

FIG. 1 is a perspective view illustrating a portable computer according to the present invention. FIG. 2 is a block diagram illustrating a control circuit of the portable computer according to the present invention. In the first embodiment of the present invention, element 32 of FIG. 2 is an OR gate as illustrated in FIG. 2. In the second embodiment of the present invention, item 32 would be an AND gate, while the remaining features of FIG. 2 remain the same for the second embodiment. As shown in FIGS. 1 and 2, the portable computer of the present invention includes a computer body 10 mounted with a plurality of hardware units including a main board 20 and an input unit 50, and an LCD monitor 51 hingeably mounted to the computer body 10 in such a fashion that it is hingeable between its folded state and its developed state.

In addition to the main board 20 and input unit 50, the hardware units included in the computer body 10 may include a casing 52 adapted to surround the main board 20. The main board 20 is mounted with a RAM (not shown) and a CPU (not shown). The input unit 50 generates a desired output signal in accordance with an external manipulation for the input unit 50.

The main board 20, to which the RAM and CPU are mounted, is provided with a main mounting unit 21 and a sub mounting unit 22 respectively adapted to mount optional devices 40a and 40b to be described hereinafter.

The main and sub mounting units 21 and 22 of the main board 20 are expansion IDE slots for mounting optional devices according to an IDE standard interface scheme, that is, the optional devices 40a and 40b, respectively. In the case illustrated in FIG. 1, the optional devices 40a and 40b mounted to the main and sub mounting units 21 and 22 are a CD-ROM and a hard disk driver, respectively. Of course, other devices such as a ZIP drive, a DVD-ROM, and a CD-ROM may be mounted to the main and sub mounting units 21 and 22. The main and sub mounting units 21 and 22 transmit signals outputted from the optional devices 40a and 40b to an IDE controller (not shown) of the main board 20, respectively.

The optional devices 40a and 40b, which are mounted to the main and sub mounting units 21 and 22, are provided with interface boards 41a and 41b serving as connection means adapted to electrically connect those optional devices 40a and 40b to the main and sub mounting units 21 and 22, respectively.

In addition to the function of connecting the optional devices 40a and 40b to the main and sub mounting units 21 and 22, the interface boards 41a and 41b have a function to inform a control unit 30 included in the main board 20 of whether or not the optional devices 40a and 40b are mounted to the main and sub mounting units 21 and 22, respectively. To this end, the interface boards 41a and 41b are provided with ground terminals 31a and 31b, respectively.

The control unit 30 provided at the main board 20, responds to electronic circuits and controls optional device 40a mounted to the main mounting unit 21, to be recognized as a master device while allowing the optional device 40b, mounted to the sub mounting unit 22, to be recognized as a slave device. Where there is no optional device mounted to the main mounting unit 21, that is, where the optional device 40a is not mounted, the control unit 30 responds to the same electronic circuits that now have different inputs and thus different outputs than before to allow optional device 40b, mounted to the sub mounting unit 22, to be recognized as a master device.

FIGS. 3 and 4 are dedicated to the first embodiment of the present invention. Turning to FIG. 4 illustrating the first embodiment of the present invention, when the optional devices 40a and 40b are mounted to the main and sub mounting units 21 and 22, the ground terminals 31a and 31b of the interface boards 41a and 41b transmit low-level signals to an OR gate 32 included in the control unit 30, respectively. The OR gate 32 sends a signal of a low or high level to a master-in pin included in the control unit 30, based on the signals from the main and sub mounting units 21 and 22.

The signal from the master-in pin, that is, the signal from the OR gate 32, is applied to a field effect transistor (FET) 33 included in the control unit 30. The FET 33 is short-circuited or opened in accordance with the low or high level of the signal from the OR gate 32 applied thereto. Where the FET 33 is short-circuited, a cable select signal CSEL having a low level is transmitted to a CSEL pin 36 provided at the optional device 40b. On the other hand, where the FET 33 is opened, a cable select signal CSEL having a high level is transmitted to the CSEL pin 36. In response to the signal CSEL inputted to the CSEL pin 36 of the optional device 40b, the control unit 30 recognizes the optional device 40b as a master or slave device.

The procedure for automatically setting an optional device mounted to a portable computer as a master or slave device, using the above mentioned configuration according to the present invention, will be described according to the first embodiment of the present invention as illustrated in FIG. 3. In a first example, optional devices according to the IDE standard interface scheme, that is, the optional devices 40a and 40b, are mounted to the main and sub mounting units 21 and 22 provided at the main board 20, respectively. Once the optional devices 40a and 40b are mounted to the main and sub mounting units 21 and 22, the ground terminals 31a and 31b provided at the interface boards 41a and 41b included in the optional devices 40a and 40b transmit low-level signals to the OR gate 32 included in the control unit 30, respectively.

As a result, the OR gate 32 applies a low or high-level signal to the master-in pin of the control unit 30. The FET 33 in this first embodiment is a p-channel FET 33 of the control unit 30 which short-circuits its source to drain (S-D) path when the master-in signal has a low level. On the other hand, when the master-in signal has a high level, the S-D path of the FET 33 is open circuited.

In accordance with the procedure of FIG. 3, it is then determined whether or not the optional devices 40a and 40b are mounted to the main and sub mounting units 21 and 22, respectively (Steps S10 and S20). In a state in which both the optional devices 40a and 40b are mounted, a low-level signal is transmitted to the master-in pin (Step S30). In response to this master-in signal, the S-D path of the FET 33 included in the control unit 30 is short-circuited (Step S40). As a result, a low-level signal is applied to the CSEL pin 36 (Step S50).

In the illustrated case, the optional device 40b mounted to the sub mounting unit 22 is set to operate as a slave device when it receives a low-level signal. Following step S50, accordingly, the control unit 30 transmits the low-level signal to the optional device 40b mounted to the sub mounting unit 22, thereby controlling the optional device 40b to operate as a slave device (Step S60).

According to the first embodiment of the present invention illustrated in FIGS. 3 and 4, the ground terminals 31a and 31b of the interface boards 41a and 41b transmit low-level signals to an OR gate 31 when the optional devices 40a and 40b are mounted to the main and sub mounting units 21 and 22 and transmit high-level signals when the optional devices 40a and 40b are not mounted to the main and sub mounting units 21 and 22. In a second example of the first embodiment of the present invention, it is determined in step S10 that optional device 40b is mounted to the sub mounting unit 22, and that where it is determined in step S20 that the optional device 40a is not mounted to the main mounting unit 21. In regard to step 21 of such a scenario, since the optional device 40a is not mounted to the main mounting unit 21 but optional device 40b is mounted to the sub mounting unit 22, the main mounting unit transmits a high-level signal and the sub mounting unit transmits a low-level signal. These signals are transmitted to the OR gate 32 which outputs a high-level signal because the OR gate transmits a high-level signal when at least one signal of both signals is a high-level signal. Accordingly, the OR gate 32 outputs a high-level signal, as a master-in signal, to the master-in pin (Step S21).

In response to the master-in signal, the S-D path of the FET 33 is opened (Step S22), so that a high-level signal is applied to the CSEL pin 36 of the optional device 40b mounted to the sub mounting unit 22 (Step S23). As a result, the optional device 40b is recognized as a master device (Step S24).

In a third example of the first embodiment of the present invention illustrated by FIGS. 3 and 4, where it is determined at step S10 that the optional device 40b is not mounted to the sub mounting unit 22, a high-level signal is transmitted to the master-in pin of the control unit 30 (Step S15). Accordingly, the S-D path of the FET 33 is open circuited (Step S18). Thus, there is no power consumption by the FET where neither the optional device 40a nor the optional device 40b is mounted or where the optional device 40a is mounted to the main mounting unit 21 and the optional device 40b is not mounted to the sub mounting unit 22.

Generally, a CSEL pin such as the CSEL pin 36 is provided at an optional device such as the optional device 40a or 40b, in order to allow a setting of the optional device as a master or slave device. Typically, the setting of the optional device 40a or 40b is carried out in such a fashion that it is recognized as a master device when the signal inputted to the CSEL pin 36 has a high level while being recognized as a slave device when the signal has a low level. In a second embodiment of the present invention as illustrated in FIG. 5, the optional device 40a or 40b may be set in a manner reverse to that of the previous embodiment so that it is recognized as a master device when the signal inputted to the CSEL pin 36 has a low level while being recognized as a slave device when the signal has a high level. In this second embodiment, the interface boards 41a and 41b should be appropriately designed in order to change the signals to be inputted to the CSEL pin 36. This requires ground terminals 31a and 31b to send a high signal to a logic gate 32 in the main board 20 if an external device 40a or 40b are inserted into respective mounting units. In addition, in this second embodiment, logic gate 32 must be an AND gate to provide a high signal on a CSEL pin 36 when external device 40b is a slave device and a low signal on CSEL pin 36 when external device 40b is a master device. In the second embodiment as illustrated in FIG. 5, the FET 33 is a p-channel FET.

Although the control unit 30, main mounting unit 21 and sub mounting unit 22 have been described as being provided at the main board 20, they may be installed at a docking station (not shown) operatively connected to the portable computer. In this case, of course, the objects of the present invention can be accomplished.

Also, the control unit 30 has been described as including an OR or an AND gate 32, ground terminals 31a and 31b, and FET 33 for a configuration adapted to enable a recognition for optional devices respectively mounted to the main and sub mounting units 21 and 22, that is, the optional devices 40a and 40b. For this configuration, various modifications, additions and substitutions are possible, without departing from the scope and spirit of the invention as disclosed in the accompanying claims. For instance, the OR gate may be replaced by an AND gate as disclosed in the second embodiment illustrated in FIG. 5. Other embodiments may include using an n-channel FET instead of a p-channel FET as used in the first two embodiments of the present invention.

As apparent from the above description, the present invention provides a portable computer including main and sub mounting units connected to a main board, and a control unit for conducting a control allowing optional devices, mounted to the mounting units, to be used irrespective of a master/slave setting condition initially made.

Also, the present invention provides an automatic master/slave setting method for optional devices mounted to a portable computer, which is capable of allowing each of the optional devices to be used irrespective of the master/slave setting condition initially made.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A computer system, comprising:
   a computer body;
   a main board mounted to the computer body;
   main and sub mounting units connected to the main board and adapted to allow external devices according to an integrated drive electronics (IDE) standard interface scheme to be mounted thereto, respectively;
   external devices each adapted to output a signal indicative of whether or not the external device is connected to an associated one of the main and sub mounting units, each of the external devices having a connection means to be coupled to an associated one of the main and sub mounting units; and
   a control unit recognizing an external device mounted to the sub mounting unit as a slave device when an external device is mounted to said main mounting unit based on said indicative signals from both said external devices, while recognizing an external device mount to the sub mounting unit as a master device when said main mounting unit is absent an external device, based on an indicative signal from said external device mounted in said sub mounting unit and an absence of an indicative signal from an external device that is not mounted in said main mounting unit.

2. The computer system of claim 1, wherein the connection means has a ground terminal for outputting the signal indicative of whether or not the external device associated said ground terminal is connected to an associated one of the main and sub mounting units.

3. The computer system of claim 1, further comprising a docking station separated from the computer body while being connected to the main board for a signal exchange with the main board, the docking station being provided with the control unit and the main and sub mounting units.

4. The computer system of claim 1, further comprising an electronic circuit disposed in said main board causing said control unit to recognize an external unit mounted in said sub mounting unit as a master or a slave device based on indicative signals and lack thereof from said external devices to said main board.

5. The computer system of claim 4, said electronic circuit comprising:
   an OR-gate for receiving said indicative signals from said external devices;
   a Field Effect Transistor for generating a voltage based on an output from said OR-gate; and
   a cable select pin located in said external device attached to said sub mounting unit and connected to said Field Effect Transistor, said cable select pin relaying said voltage from said Field Effect Transistor indicating whether said external device connected to said sub mounting unit will be recognized as a master or a slave device by said control unit.

6. The computer system of claim 5, wherein said Field Effect Transistor is a p-channel Field Effect Transistor.

7. The computer system of claim 4, said electronic circuit comprising:
   an AND-gate for receiving said indicative signals from said external devices;
   a Field Effect Transistor for generating a voltage based on an output from said AND-gate; and
   a cable select pin located in said external device attached to said sub mounting unit and connected to said Field Effect Transistor, said cable select pin relaying said voltage from said Field Effect Transistor indicating whether said external device connected to said sub mounting unit will be recognized as a master or a slave device by said control unit.

8. The computer system of claim 7, wherein said Field Effect Transistor is a p-channel Field Effect Transistor.

9. The computer system of claim 1, wherein said main mounting unit and said sub mounting unit are part of said main board in said computer body.

10. The computer system of claim 1, said main and said sub mounting units being two separate bays in the computer body that swappably accommodate external devices.

11. The computer system of claim 1, said control unit being programmed and configured to always recognize an external device mounted in the main mounting unit as a master device and not as a slave device.

12. The computer system of claim 1, said control unit being programmed and configured to recognize an external device mounted in the sub mounting unit as a master device or a slave device based only on the absence or presence respectively of an external device in the main mounting unit.

13. An automatic setting method of master/slave devices mounted to a portable computer, comprising the steps of:
   providing a computer body, a pair of mounting units adapted to allow the external devices to be mounted thereto, respectively, each of the external devices having a configuration according to an integrated drive electronics (IDE) standard interface scheme, and a main board connected with the mounting units;
   setting the mounting units as main and sub mounting units, respectively;
   determining whether or not the external devices are mounted to the main and sub mounting units, respectively; and
   recognizing the external device mounted to the sub mounting unit as a slave device when an external device is concurrently mounted in the main mounting unit and recognizing the external device mount to the sub mounting unit as a master device when the main mounting unit is absent of an external device.

14. The method of claim 13, wherein the determination of whether or not each of the external devices is mounted to an associated one of the main and sub mounting units is carried out, based on a ground signal generated when the external device is mounted to the associated mounting unit.

15. The method of claim 13, further comprising treating the external device mounted in the sub mounting unit as a slave or as a master device depending only on whether or not the main mounting unit is concurrently occupied by another external device.

16. The method of claim 13, further comprising:
   inserting a first external device into the main mounting unit;
   automatically recognizing the first external device as a master device and not a slave device;
   inserting a second external device into the sub mounting unit;
   automatically recognizing the second external device as a slave device and not a master device;
   removing the first external device from the main mounting unit; and automatically changing the recognition of the second external device mounted in the sub mounting unit from a slave device to a master device immediately upon sensing the removal of the first external device from the main mounting unit.

17. A portable computer, comprising:

a computer body;

a first peripheral bay and a second and separate peripheral bay, each of said first and said second peripheral bay capable of accommodating swappable peripheral devices;

a main board complying with integrated drive electronics standard interface scheme arranged in the computer body, said main board providing electrical connections to the first peripheral bay and the second peripheral bay and to any swappable peripheral devices connected to said first and said second peripheral bays; and a control unit programmed and configured to sense a presence and an absence of a swappable peripheral device in each of the first and the second peripheral bay, said controller being programmed and configured to treat a swappable peripheral device in said second peripheral bay as a slave or a master device based only on whether or not a swappable peripheral device is concurrently present in the first peripheral bay.

18. The portable computer of claim 17, the control unit being programmed and configured to always treat a peripheral device in the first peripheral bay as a master device and not as a slave device.

19. The portable computer of claim 17, further comprising a docking station, the first and the second peripheral bays being in the docking station and not in the computer body.

20. The portable computer of claim 17, the first and the second peripheral bays being in the computer body underneath a keyboard, the main board being electrically connected to electrical sockets in each peripheral bay that electrically connect with peripheral devices in the peripheral bays.

* * * * *